United States Patent
Kassai (10) Patent No.: US 9,903,322 B2
(45) Date of Patent: Feb. 27, 2018

(54) CONTROL DEVICE AND CONTROL METHOD FOR INTERNAL COMBUSTION ENGINE WITH SUPERCHARGER

(71) Applicant: NISSAN MOTOR CO., LTD., Yokohama-shi, Kanagawa (JP)

(72) Inventor: Masaharu Kassai, Yamato (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 252 days.

(21) Appl. No.: 14/380,525

(22) PCT Filed: Feb. 28, 2013

(86) PCT No.: PCT/JP2013/055302
§ 371 (c)(1),
(2) Date: Aug. 22, 2014

(87) PCT Pub. No.: WO2013/133112
PCT Pub. Date: Sep. 12, 2013

(65) Prior Publication Data
US 2015/0013637 A1  Jan. 15, 2015

(30) Foreign Application Priority Data
Mar. 9, 2012 (JP) .................................. 2012-052522

(51) Int. Cl.
*F02M 31/20* (2006.01)
*F02D 41/06* (2006.01)
(Continued)

(52) U.S. Cl.
CPC ........... *F02M 31/205* (2013.01); *F02B 47/08* (2013.01); *F02D 41/0007* (2013.01);
(Continued)

(58) Field of Classification Search
CPC .. F02D 41/068; F02D 41/0007; F02D 41/064; F02D 2700/03; F02B 47/08; F02B 23/105; F02M 31/205; Y02T 10/144
See application file for complete search history.

(56) References Cited

U.S. PATENT DOCUMENTS

| | | | |
|---|---|---|---|
| 5,427,078 A * | 6/1995 | Hitomi | F02B 27/02 123/184.53 |
| 7,213,566 B1 * | 5/2007 | Jankovic | F02D 37/02 123/302 |

(Continued)

FOREIGN PATENT DOCUMENTS

| | | |
|---|---|---|
| EP | 0937 879 A2 | 8/1999 |
| JP | S63-201343 A | 8/1988 |
| JP | 2011-231741 A | 11/2011 |

*Primary Examiner* — Hung Q Nguyen
*Assistant Examiner* — Brian P Monahon
(74) *Attorney, Agent, or Firm* — Drinker Biddle & Reath LLP (57) ABSTRACT

An internal combustion engine (1) is provided with a supercharger (12) and a cylinder direct injection fuel injector (10). When the engine shifts in a low-speed supercharging region at a state where the wall temperature of a cylinder bore (3) is low, liquid fuel adheres to a wall surface of the cylinder bore (3) so that lubricating oil is diluted with the liquid fuel and released into a combustion chamber (4). As a result, there occurs abnormal combustion. In the present invention, the fuel injection amount is increased at the time when the engine shifts in a predetermined low-speed supercharging region. The lower the wall temperature of the cylinder bore, the larger the rate of increase of the fuel injection amount. This makes it possible to suppress the temperature of air-fuel mixture in the vicinity of compression top dead center and prevent the occurrence of abnormal combustion.

8 Claims, 8 Drawing Sheets

(51) Int. Cl.
  *F02D 41/00*  (2006.01)
  *F02B 47/08*  (2006.01)
  *F02B 23/10*  (2006.01)
  *F02M 26/00*  (2016.01)
(52) U.S. Cl.
  CPC .......... *F02D 41/068* (2013.01); *F02B 23/105* (2013.01); *F02D 41/064* (2013.01); *F02D 2700/03* (2013.01); *F02M 26/00* (2016.02); *Y02T 10/144* (2013.01)

(56) References Cited

U.S. PATENT DOCUMENTS

| | | | |
|---|---|---|---|
| 2005/0011484 A1 | 1/2005 | Wagner et al. | |
| 2005/0016496 A1* | 1/2005 | Hitomi | F01L 1/053 123/305 |
| 2006/0037306 A1* | 2/2006 | Pozar | F02D 41/0002 60/285 |
| 2006/0144046 A1* | 7/2006 | Vetrovec | F02B 33/40 60/605.1 |
| 2006/0168958 A1* | 8/2006 | Vetrovec | F02B 33/40 60/599 |
| 2007/0017484 A1* | 1/2007 | Kinose | F02D 41/3094 123/431 |
| 2007/0125346 A1* | 6/2007 | Vetrovec | F02B 33/40 123/563 |
| 2007/0157903 A1* | 7/2007 | Zurlo | F02D 41/0025 123/406.3 |
| 2007/0180824 A1* | 8/2007 | Yamagata | F02B 37/04 60/599 |
| 2007/0215102 A1* | 9/2007 | Russell | F02D 41/0025 123/310 |
| 2008/0168966 A1* | 7/2008 | Bromberg | F02B 47/04 123/528 |
| 2008/0245342 A1 | 10/2008 | Werner | |
| 2009/0259388 A1* | 10/2009 | Vetrovec | F02B 33/40 701/103 |
| 2010/0077990 A1* | 4/2010 | Shishime | F02D 13/0261 123/299 |
| 2010/0077992 A1* | 4/2010 | Auclair | F02D 19/12 123/435 |
| 2010/0175657 A1* | 7/2010 | Pursifull | F02D 41/008 123/179.16 |
| 2010/0242899 A1* | 9/2010 | Hitomi | F02D 41/3035 123/299 |
| 2011/0067679 A1* | 3/2011 | Hitomi | F02D 41/3035 123/564 |
| 2011/0144891 A1* | 6/2011 | Nakamura | F02D 41/065 701/104 |
| 2011/0180038 A1* | 7/2011 | Yamakawa | F02M 26/01 123/435 |
| 2011/0180047 A1* | 7/2011 | Yamakawa | F02B 1/12 123/564 |
| 2012/0004830 A1* | 1/2012 | Miyagawa | F01N 5/02 701/103 |
| 2012/0012086 A1* | 1/2012 | Yoeda | F02B 29/083 123/559.1 |
| 2012/0016567 A1* | 1/2012 | Delpech | F02D 19/0647 701/103 |
| 2012/0090319 A1* | 4/2012 | Mond | F02B 37/04 60/609 |
| 2012/0271533 A1* | 10/2012 | Shishime | F02D 35/021 701/105 |
| 2012/0285165 A1* | 11/2012 | Han | F01D 17/141 60/605.2 |

* cited by examiner

CONTROL DEVICE AND CONTROL METHOD FOR INTERNAL COMBUSTION ENGINE WITH SUPERCHARGER

FIELD OF THE INVENTION

The present invention relates to a control device and control method for an internal combustion engine with a supercharger and, more particularly, to a technique for preventing the occurrence of abnormal combustion in a cylinder direct injection type internal combustion engine due to oil component under low engine temperature conditions.

BACKGROUND ART

Patent Document 1 teaches the occurrence of abnormal combustion in an internal combustion engine by simultaneous introduction of engine lubricating oil and intake air into a combustion chamber in a low-speed high-load range. It is herein described that oil mist entrained in blow-by gas remains within an intake surge tank of the engine and flows together with intake air stream into the combustion chamber. In order to prevent the occurrence of abnormal combustion due to such oil component, there is disclosed a technique of estimating the amount of oil flowing into each cylinder and performing boost pressure control, air-fuel ratio enrichment, ignition timing retardation etc. according to the estimated oil amount. In particular, Patent Document 1 considers that the probability of occurrence of abnormal combustion due to oil component increases with cylinder bore wall temperature as in the case of usual knocking and thus proposes increasing the degree of boost pressure control or air-fuel ratio enrichment in response to increase in cylinder bore wall temperature.

There is however a possibility of intense abnormal combustion (one sort of pre-ignition phenomenon) accompanied by extraordinary noise, which is different from usual knocking, at the time when a supercharger-equipped internal combustion engine, notably of cylinder direct injection type, shifts into a supercharging region at a low rotation speed e.g. with the depression of an accelerator pedal by a driver during warm-up operation where engine temperature is low.

The above-mentioned abnormal combustion could occur even without the inflow of oil component from the intake system. The present inventor has found, as a result of research, that the above-mentioned abnormal combustion is a different type of abnormal combustion that occurs by a different mechanism from that described in Patent Document 1.

The following are the findings of the research made by the present inventor. In a state where a cylinder bore wall is relatively low in temperature, fuel (in general, gasoline) injected from a cylinder direct injection fuel injector adheres in the form of droplets onto a surface of the cylinder bore wall; whereas oil is present in the form of a very thin film on the surface of the cylinder bore for lubrication of a sliding surface of a piston. With upward movement of the piston, the oil and the fuel droplets gather in a crevice above an uppermost piston ring of the piston (i.e. a slot-like space having three sides surrounded by an outer circumferential surface of the piston, the surface of the cylinder bore wall and the piston ring) so that the oil is diluted with the fuel droplets. When the piston moves upward in this state during a compression stroke, the speed of the piston increases in the first half of the compression stroke but decreases from the midpoint of the compression stroke. The oil-fuel mixture is then released from the crevice into the combustion chamber under inertia force. As the air-fuel mixture inside the combustion chamber has become high in temperature and pressure by compression in the latter half of the compression stroke, the released oil component act as an ignition source to cause ignition of the air-fuel mixture before the normal ignition timing. As a result, there occurs abnormal combustion. In particular, the air-fuel mixture is high in temperature in the vicinity of a top dead center of the compression stroke in a supercharging region. Further, the actual time for the oil to be ignited as the ignition source is long at a low engine speed. The abnormal combustion is thus likely to occur in a supercharging region at a low engine speed. Although the oil is lower in volatility than the fuel, the ignitability of the oil, when vaporized, is higher than that of the fuel so that the oil readily acts as the ignition source by release into the combustion chamber.

Basically, the above-mentioned mechanism of abnormal combustion does not occur after warm-up operation of the internal combustion engine, i.e., in a state where the temperature of the cylinder bore wall is high. It is because, when the temperature of the cylinder bore wall is sufficiently high, the injected fuel rapidly evaporates upon collision with the surface of the cylinder bore wall and does not get mixed in liquid form with the oil in the crevice and because the oil solely accumulated in the crevice maintains its high viscosity without being diluted with the fuel and does not fly into the combustion chamber with the stroke movement of the piston. Accordingly, the above-mentioned abnormal combustion becomes a problem only when the engine is in an unwarmed state where the cylinder bore wall is low in temperature. The lower the temperature of the cylinder bore wall, the more likely it becomes that the above-mentioned abnormal combustion will occur.

The present invention has been made based on these new findings. It is an object of the present invention to prevent the occurrence of abnormal combustion in a cylinder direct injection type internal combustion engine with a supercharger in a low-speed supercharging region under low engine temperature conditions.

PRIOR ART DOCUMENTS

Patent Document

Patent Document 1: Japanese Laid-Open Patent Publication No. 2011-231741

SUMMARY OF THE INVENTION

According to the present invention, there is provided a control device for an internal combustion engine, the internal combustion engine comprising a cylinder direct injection fuel injector and a supercharger, wherein the control device performs air-fuel mixture cooling control that suppresses the temperature of an air-fuel mixture in the vicinity of a compression top dead center in a predetermined low-speed supercharging region at an unwarmed state where a cylinder bore wall temperature of the internal combustion engine is low.

Namely, the control device performs air-fuel mixture cooling control that suppresses the temperature of the air-fuel mixture in the vicinity of the compression top dead center when the engine shifts into a supercharging region at a low rotation speed e.g. with the depression of an accelerator pedal by a driver during warm-up operation where the cylinder bore wall temperature is low. It is possible by this control to prevent the occurrence of abnormal combustion.

In one embodiment of the present invention, the air-fuel mixture cooling control includes increasing a fuel injection amount of the fuel injection device in such a manner that, as the cylinder bore wall temperature is lower, the rate of increase of the fuel injection amount is larger. The increase correction of the fuel injection amount makes it possible to produce a cooling effect by heat of vaporization and suppress the temperature of the air-fuel mixture.

In another embodiment of the present invention, the air-fuel mixture cooling control includes allowing a variable compression ratio mechanism to decrease a mechanical compression ratio of the internal combustion engine in such a manner that, as the cylinder bore wall temperature is lower, the mechanical compression ratio is lower. The decrease correction of the mechanical compression ratio makes it possible to suppress the temperature of the air-fuel mixture in the vicinity of the compression top dead center.

In still another embodiment of the present invention, the air-fuel mixture cooling control includes allowing a variable valve mechanism to increase a valve overlap between intake valve opening timing and exhaust valve closing timing in such a manner that, as the cylinder bore wall temperature is lower, the valve overlap is larger. The increase correction of the valve overlap makes it possible to discharge the high-temperature remaining gas from the cylinder and suppress the temperature of the air-fuel mixture in the vicinity of the compression top dead center.

In yet another embodiment of the present invention, the air-fuel mixture cooling control includes allowing an exhaust gas recirculation system to recirculate exhaust gas in such a manner that, as the cylinder bore wall temperature is lower, the rate of recirculation of the exhaust gas is larger. As the heat capacity ratio of the air-fuel mixture is decreased by the recirculation of the exhaust gas, the recirculation of the exhaust gas makes it possible to decrease the temperature of the air-fuel mixture in the vicinity of the compression top dead center even if the recirculated exhaust gas is higher in temperature than the intake air. It is preferable to cool the exhaust gas by an EGR gas cooler and then recirculate the cooled exhaust gas in order to more efficiently suppress the temperature of the air-fuel mixture.

In a further embodiment of the present invention, the air-fuel mixture cooling control includes allowing an intercooler to cool intake air in such a manner that, as the cylinder bore wall temperature is lower, the cooling of the intake air is more enhanced.

As mentioned above, it is possible according to the present invention to assuredly prevent the occurrence of abnormal combustion in the cylinder direct injection type internal combustion engine with the supercharger even when the engine shifts in a supercharging region at a low rotation speed e.g. with the depression of an accelerator pedal by a driver during warm-up operation where the cylinder bore wall temperature is low.

DESCRIPTION OF EMBODIMENTS

A first embodiment of the present invention will be first described below with reference to the drawings.

Figure 1:
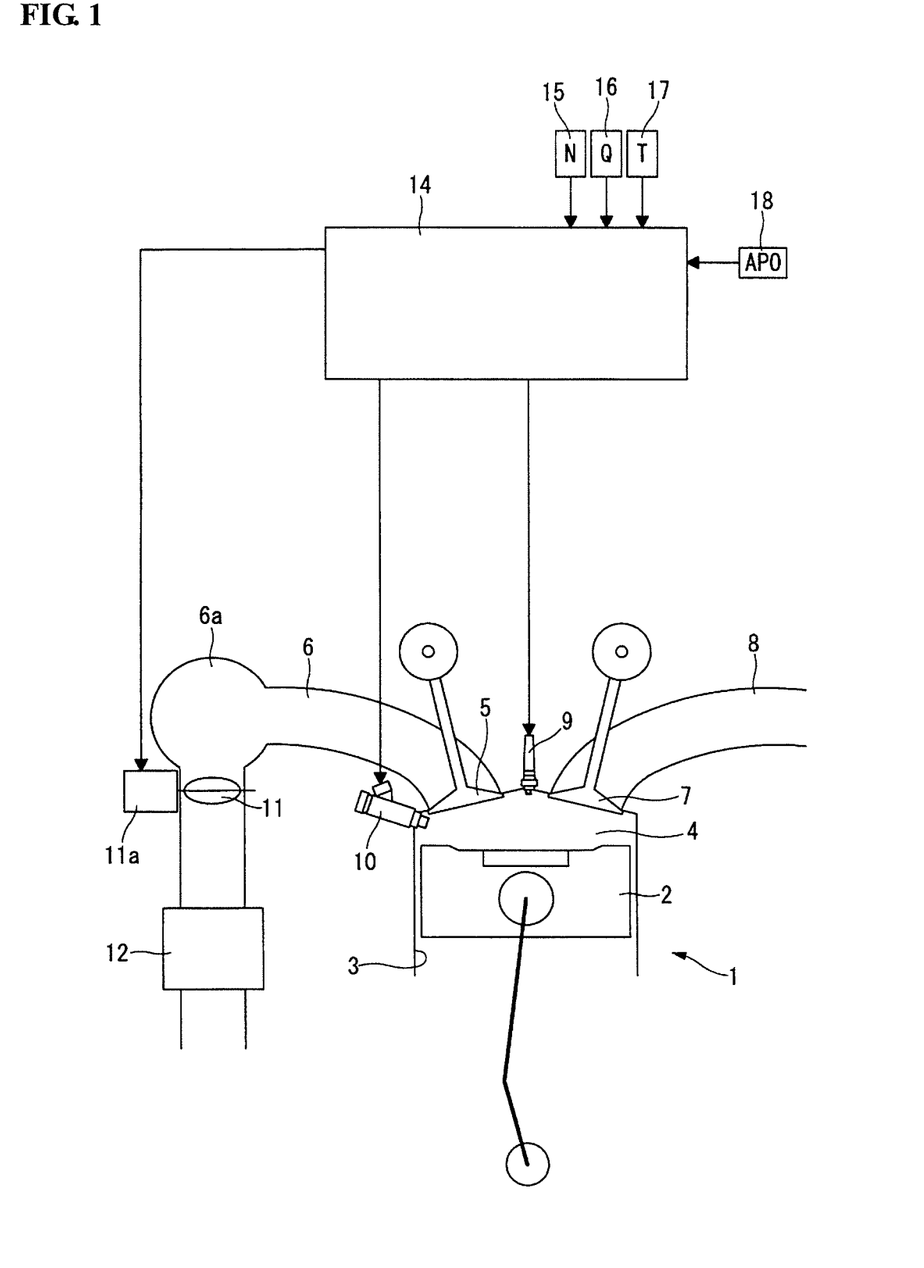
FIG. 1 is a schematic view of an internal combustion engine with a supercharger according to a first embodiment of the present invention.

FIG. 1 is a schematic view of a supercharger-equipped internal combustion engine 1 according to the first embodiment of the present invention. In the internal combustion engine 1, a piston 2 is arranged in a cylinder bore 3 to define a combustion chamber 4; and an intake passage 6 and an exhaust passage 8 are connected to the combustion chamber 4 via an intake valve 5 and an exhaust valve 7, respectively.

A spark plug 9 is arranged in a ceiling wall of the combustion chamber 4. A fuel injection valve 10 is arranged in one side of the combustion chamber 4 so as to directly inject fuel into the combustion chamber 4.

A throttle valve 11 whose opening is adjusted by an actuator 11a such as electric motor is located upstream of a collector 6a in the intake passage 6. Further, a supercharger 12 is located upstream of the throttle valve 11 in the intake passage 6. As the supercharger 12, there can be used a known turbosupercharger in which a centrifugal compressor and an exhaust turbine are coaxially connected to each other or any other known mechanical supercharger. By the action of the supercharger 12, the inside of the collector 6a is set to a negative pressure in a low-load range A with respect to a given boundary line L and is set to a positive pressure in a high-load range B with respect to the boundary line L as schematically shown in FIG. 2.

The fuel injection amount and injection timing of the fuel injection valve 10, the ignition timing of the spark plug 9 etc. are controlled by an engine controller 14. The engine controller 14 receives input signals from various sensors such as a crank angle sensor 15 to detect a rotation speed N and crank angle position of the internal combustion engine, an intake amount sensor 16 to detect an intake air amount Q of the internal combustion engine, a temperature sensor 17 to detect a wall temperature T of the cylinder bore 3 and an accelerator opening sensor 18 to detect an opening APO of an accelerator pedal operated by a driver (referred to as "accelerator opening"). In general, the opening of the throttle valve 11 is controlled according to the accelerator opening APO. As the temperature sensor 12, there can be used a lubricating oil temperature sensor or coolant temperature sensor etc. that is closely correlated with the wall temperature of the cylinder bore 3. It is alternatively feasible to directly detect the wall temperature of the cylinder bore 3 with the use of a thermocouple etc.

Figure 2:
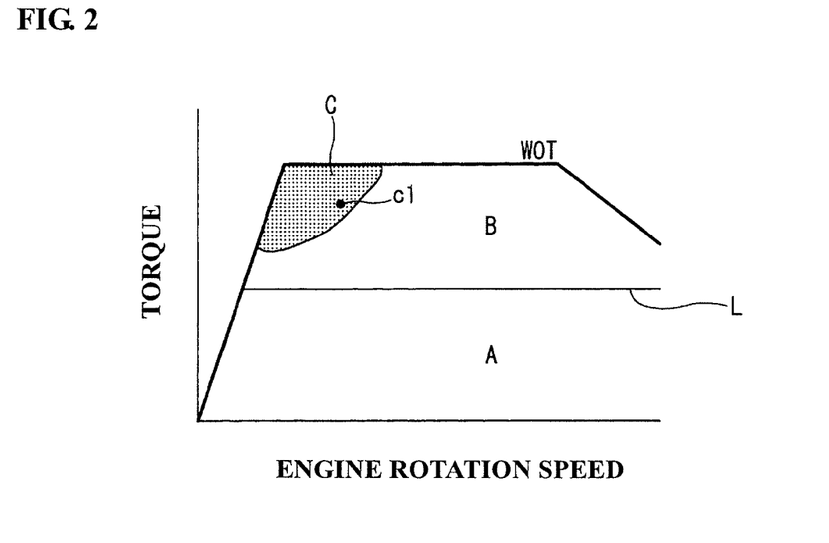
FIG. 2 is a schematic view showing operation ranges of the internal combustion engine.
Figure 3:
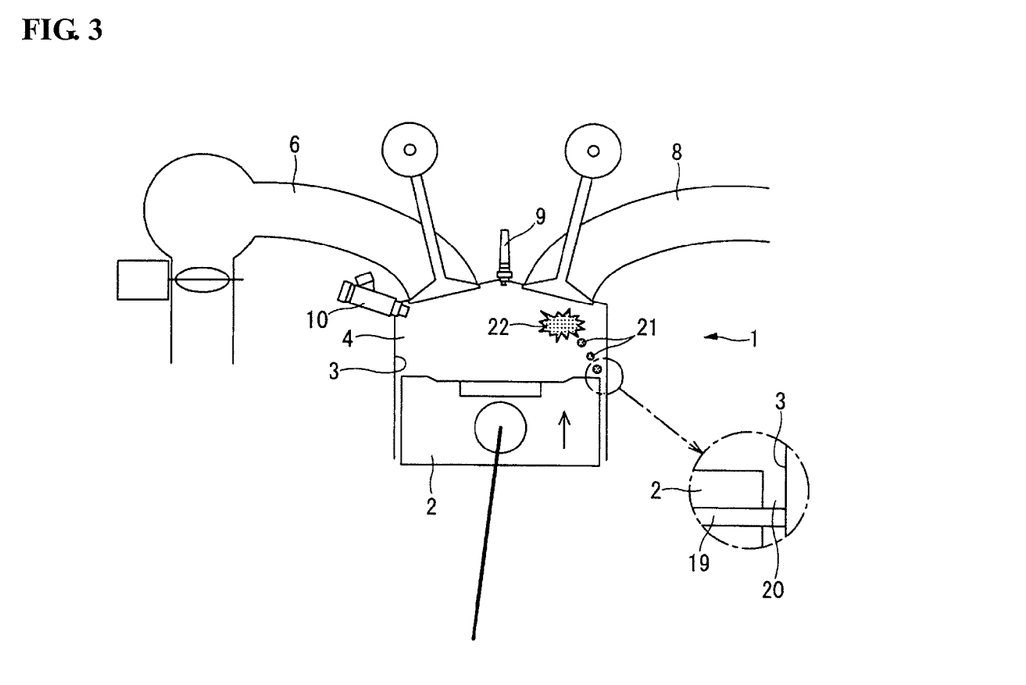
FIG. 3 is a schematic view showing the mechanism of occurrence of abnormal combustion due to oil component in the internal combustion engine.

It is likely in the above-structured cylinder direct injection internal combustion engine with the supercharger 12 that abnormal combustion (pre-ignition phenomenon) will occur due to oil component in a predetermined low-speed supercharging region such as region C in FIG. 2 at an unwarmed state where the wall temperature of the cylinder bore 3 is relatively low. FIG. 3 is a schematic view showing the mechanism of occurrence of this abnormal combustion. In the case of injecting the fuel from the fuel injection valve 10 into the cylinder during the state where the wall temperature of the cylinder bore 3 is low, the fuel adheres in the form of droplets onto the wall surface of the cylinder bore 3; whereas a very thin film of oil is present on the wall surface of the cylinder bore 3 for lubrication of a sliding surface of the piston 2. With upward movement of the piston 2, the oil and the fuel droplets gather in a crevice 20 above an uppermost piston ring 19 of the piston 2 (i.e. a slot-like space having three sides surrounded by an outer circumferential surface of the piston 2, the wall surface of the cylinder bore 3 and the piston ring 19) so that the oil is diluted with the fuel droplets. When the piston 2 moves upward in this state during a compression stroke, the speed of the piston 2 increases in the first half of the compression stroke but decreases from the midpoint of the compression stroke. The oil-fuel mixture is thus released from the crevice 20 into the combustion chamber 4 under inertia force as designated by reference numeral 21 in FIG. 3. As the air-fuel mixture inside the combustion chamber 4 has become high in temperature and pressure by compression in the latter half of the compression stroke, the released oil component acts as an ignition source to cause ignition of the air-fuel mixture (see reference numeral 22). As a result, there occurs abnormal combustion before the normal ignition timing.

Figure 4:
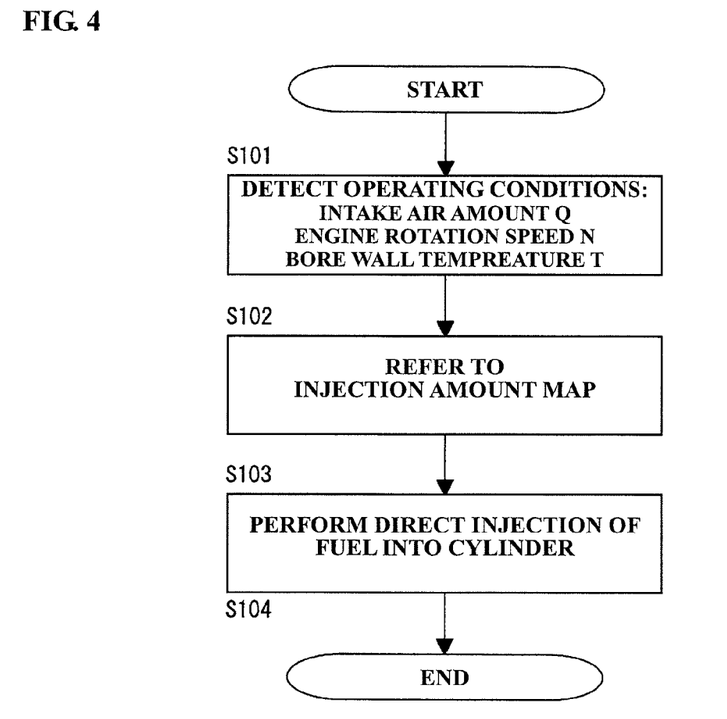
FIG. 4 is a flowchart of injection amount control for the internal combustion engine according to the first embodiment of the present invention.

In the first embodiment, the occurrence of abnormal combustion at such an engine cold state is prevented by increasing the fuel injection amount. FIG. 4 is a flowchart briefly showing the procedure of increase correction of the fuel injection amount of the fuel injection valve 10. At step S101, the intake air amount Q, the engine rotation speed N and the cylinder bore wall temperature T are detected as engine operating conditions. At step S102, the fuel injection amount is determined according to the intake air amount Q, the engine rotation speed N and the cylinder bore wall temperature T with reference to a fuel injection amount map. The fuel injection amount map has been prepared in advance as a three-dimensional map on which the optimal value of the fuel injection amount is identified relative to the intake air amount Q, the engine rotation speed N and the cylinder bore wall temperature T as parameters. At step S103, the thus-determined fuel injection amount of fuel is directly injected from the fuel injection valve 10 into the cylinder at the proper injection timing. It is alternatively feasible to first determine a basic fuel injection amount based on the intake air amount Q and the engine rotation speed N and then determine a final fuel injection amount by multiplication of the basic fuel injection amount by a correction factor corresponding to the cylinder bore wall temperature T.

Figure 5:
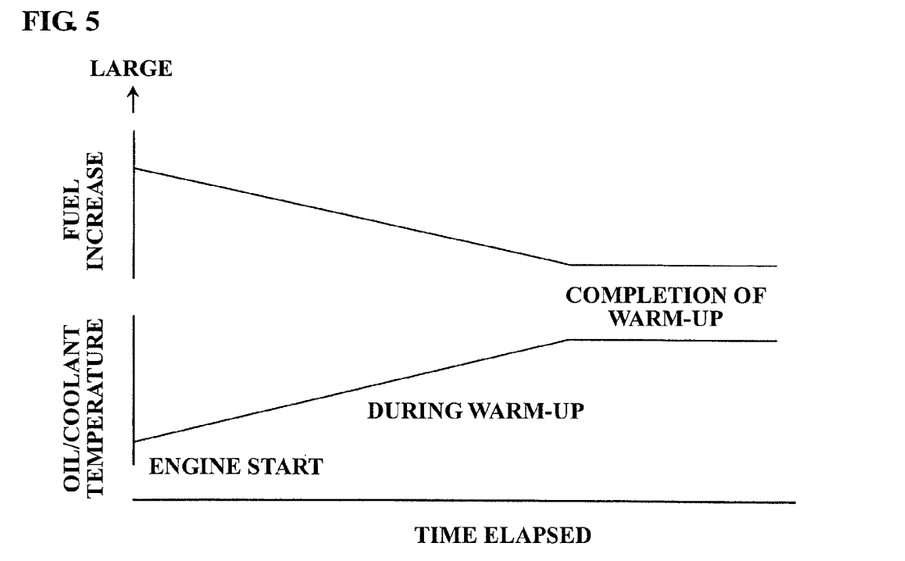
FIG. 5 is a schematic diagram showing the characteristics of the rate of increase of a fuel injection amount relative to a cylinder bore wall temperature of the internal combustion engine.

The above-obtained fuel injection amount includes an increase of fuel required to prevent the occurrence of abnormal combustion in the region C as intended by the present invention. FIG. 5 is a schematic diagram showing how the rate of increase of the fuel injection amount changes as the cylinder bore wall temperature T increases with time after cold engine start-up, taking as an example a specific load and rotation speed operation point (e.g. operation point c1 in FIG. 2) in the region C for the purposes of simplicity of explanation. At the specific load and rotation speed operation point c1 in the region C during warm-up operation before the completion of engine warm-up, the fuel injection amount is increased and corrected to a larger value than that after the completion of engine warm-up as shown FIG. 5. The rate of increase of the fuel injection amount (e.g. assuming the fuel injection amount after the completion of engine warm-up as 1) is set larger as the cylinder bore wall temperature T is lower. Namely, the lower the cylinder bore wall temperature T, the larger the enrichment degree of the air-fuel ratio, so that the temperature of the air-fuel mixture in the vicinity of the compression top dead center can be suppressed by the cooling effect due to heat of vaporization. As the operation point c1 in the high-load range where high torque is required, the air-fuel ratio is controlled to a richer value at the operation point c1 than the stoichiometric air-fuel ratio even after the completion of engine warm-up.

It is therefore possible to assuredly prevent the occurrence of abnormal combustion due to the released oil component by increasing the fuel injection amount and thereby decreasing the temperature of the air-fuel mixture in the vicinity of the compression top dead center at the state where the cylinder bore wall temperature T is low.

In many of intake port injection type internal combustion engines and some of cylinder direct injection type internal combustion engines, so-called "coolant temperature-dependent fuel increase correction" is performed in such a manner that the fuel injection amount increases with decrease in coolant temperature in order to compensate for a phenomenon in which the air-fuel ratio inside the cylinder becomes substantially lean due to wall flow of the injected fuel at the time of cold engine start-up. However, the fuel increase correction of the present invention is different from the coolant temperature-dependent fuel increase correction. In the coolant temperature-dependent fuel increase correction, the increase of the fuel injection amount is set to a minimum necessary value such that the air-fuel ratio does not become leaner than a lean combustion limit due to wall flow of the injected fuel; and, after the lapse of a short time immediately following the engine start-up, the exhaust air-fuel ratio is basically equal to the stoichiometric air-fuel ratio. By contrast, the fuel increase correction of the present invention is performed upon satisfaction of three conditions: warm-up operation, engine low rotation speed and supercharging region in order to prevent the above-mentioned abnormal combustion specific to the cylinder direct injection type internal combustion engine with the supercharger. In the fuel increase correction of the present invention, the increase of the fuel injection amount is relatively set large so as to temporarily enrich the exhaust air-fuel ratio and suppress the temperature of the air-fuel mixture in the vicinity of the compression top dead center.

In other words, the fuel increase correction of the present invention and the coolant temperature-dependent fuel increase correction are of different purposes. The fuel increase correction of the present invention can be performed in addition to the coolant temperature-dependent fuel increase correction in the case where the conditions of the fuel increase correction of the present invention are satisfied during the progress of the coolant temperature-dependent fuel increase correction immediately after the cold engine start-up.

Although the increase rate of the fuel injection amount continuously decreases with time in FIG. 5, it is herein noted that FIG. 5 merely shows the characteristics of the increase rate of the fuel injection amount at the operation point c1 in the region C. As the region C is a low-speed high-load region, there is almost no case where the operation point remains in the region C for a long time in the actual driving situation. The operation point temporarily crosses over the region C, for example, when the accelerator pedal is suddenly depressed at around idling. The fuel increase correction of FIG. 5 is not performed in any region other than the region C. In the actual driving situation, the fuel increase correction is initiated at the time of shift into the region C from the other region and is cancelled at the time of shift from the region C into the other region. The fuel increase correction is temporarily performed within the region C by varying the increase rate of the fuel injection amount depending on the cylinder bore wall temperature T. If the operation point does not shift in the region C during the time from the cold engine start-up to the completion of engine warm-up, the fuel increase correction is no performed. It is rather rare in the actual driving situation that the fuel increase correction will be performed up until the completion of engine warm-up.

Figure 6:
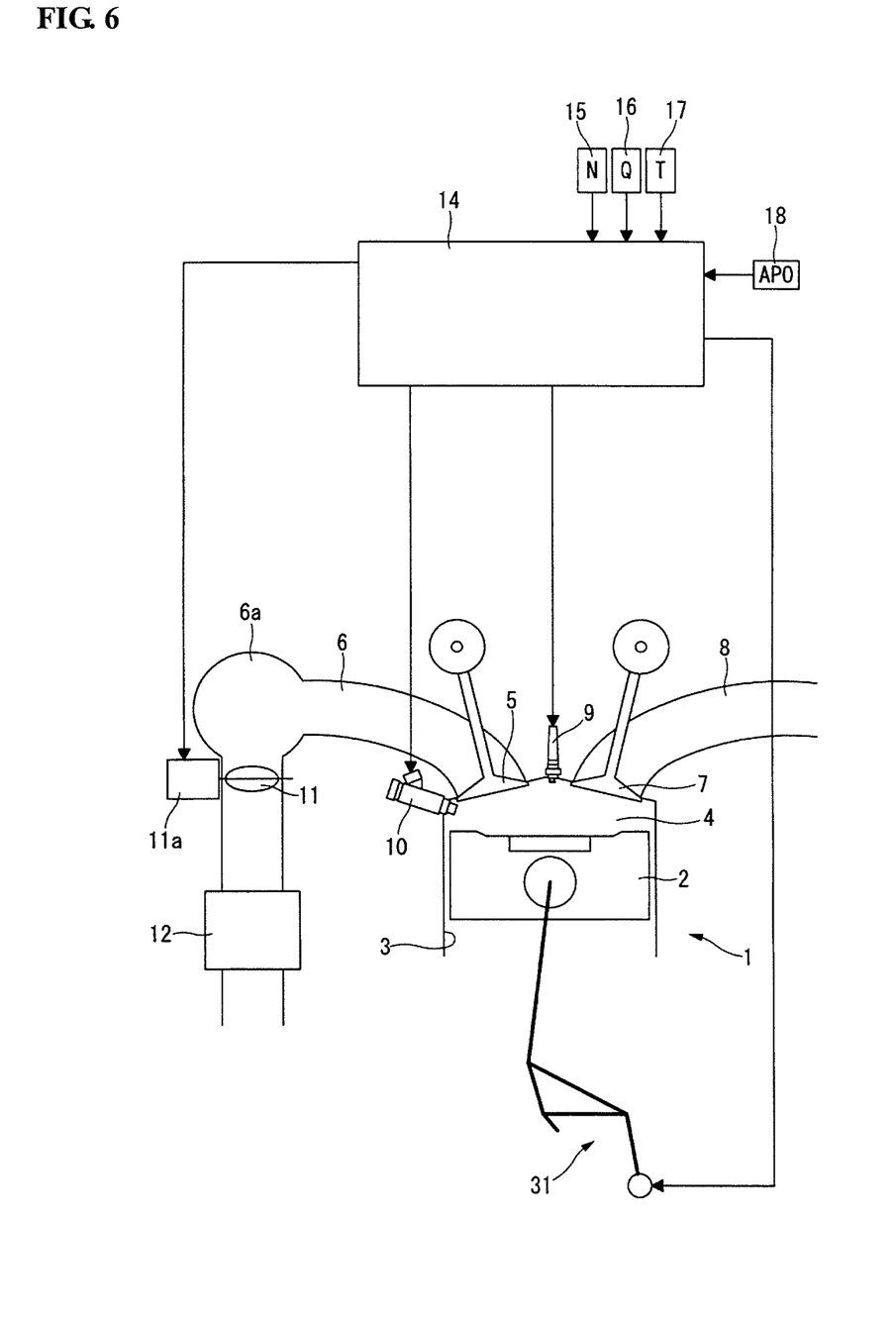
FIG. 6 is a schematic view of an internal combustion engine with a supercharger according to a second embodiment of the present invention.

Next, a second embodiment of the present invention will be described below with reference to FIGS. 6 and 7. As shown in FIG. 6, a variable compression ratio mechanism 31 is arranged in the internal combustion engine 1 so as to continuously or stepwisely vary a mechanical compression ratio of the internal combustion engine 1 in the second embodiment. Herein, the variable compression ratio mechanism 31 is of known configuration such as a double-link piston-crank mechanism to vary the actual position of the piston 2 at a compression top dead center in each cycle. However, the variable compression ratio mechanism 31 is not limited to such a configuration and can be of any configuration as long as it is capable of varying the mechanical compression ratio.

Figure 7:
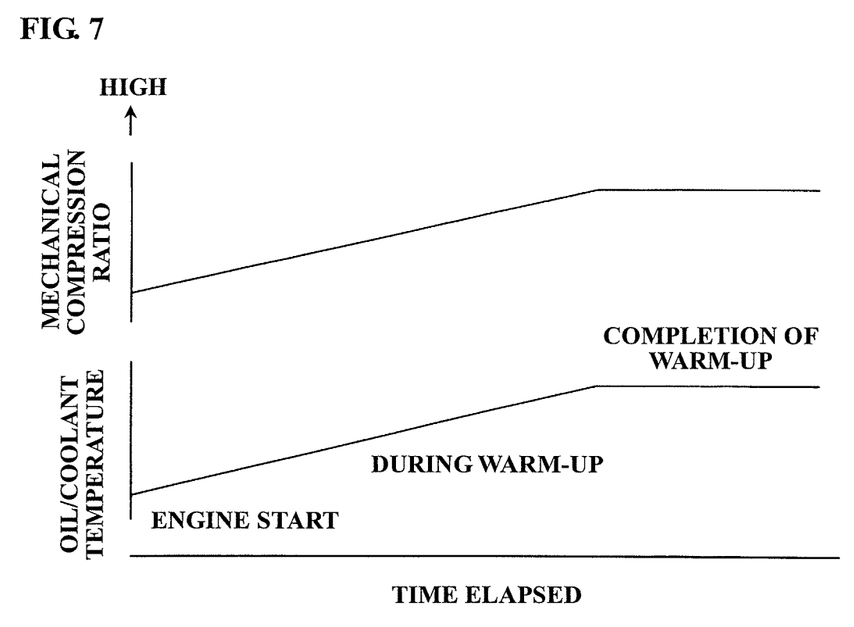
FIG. 7 is a schematic view showing the characteristics of the rate of increase of a mechanical compression ratio relative to a cylinder bore wall temperature of the internal combustion engine.

In the second embodiment, the above-mentioned abnormal combustion is prevented by decreasing the mechanical compression ratio as shown in FIG. 7. FIG. 7 is a schematic diagram similar to FIG. 5. At the specific load and rotation speed operation point c1 in the region C during warm-up operation before the completion of engine warm-up, the variable compression ratio mechanism 31 is operated to decrease and correct the mechanical compression ratio to a lower value than that after the completion of engine warm-up. The rate of correction of the mechanical compression ratio is set larger as the cylinder bore wall temperature T is lower. Namely, the lower the cylinder bore wall temperature T, the lower the mechanical compression ratio, so that the temperature of the air-fuel mixture in the vicinity of the compression top dead center can be suppressed. As the operation point c1 in the high-load range, the mechanical compression ratio is controlled to a relatively low value at the operation point c1 as compared to that in the low-load range (e.g. the range A in FIG. 2) even after the completion of engine warm-up.

It is thus possible to assuredly prevent the occurrence of abnormal combustion due to the released oil component by correcting the mechanical compression ratio and thereby decreasing the temperature of the air-fuel mixture in the vicinity of the compression top dead center at the state where the cylinder bore wall temperature T is low.

Figure 8:
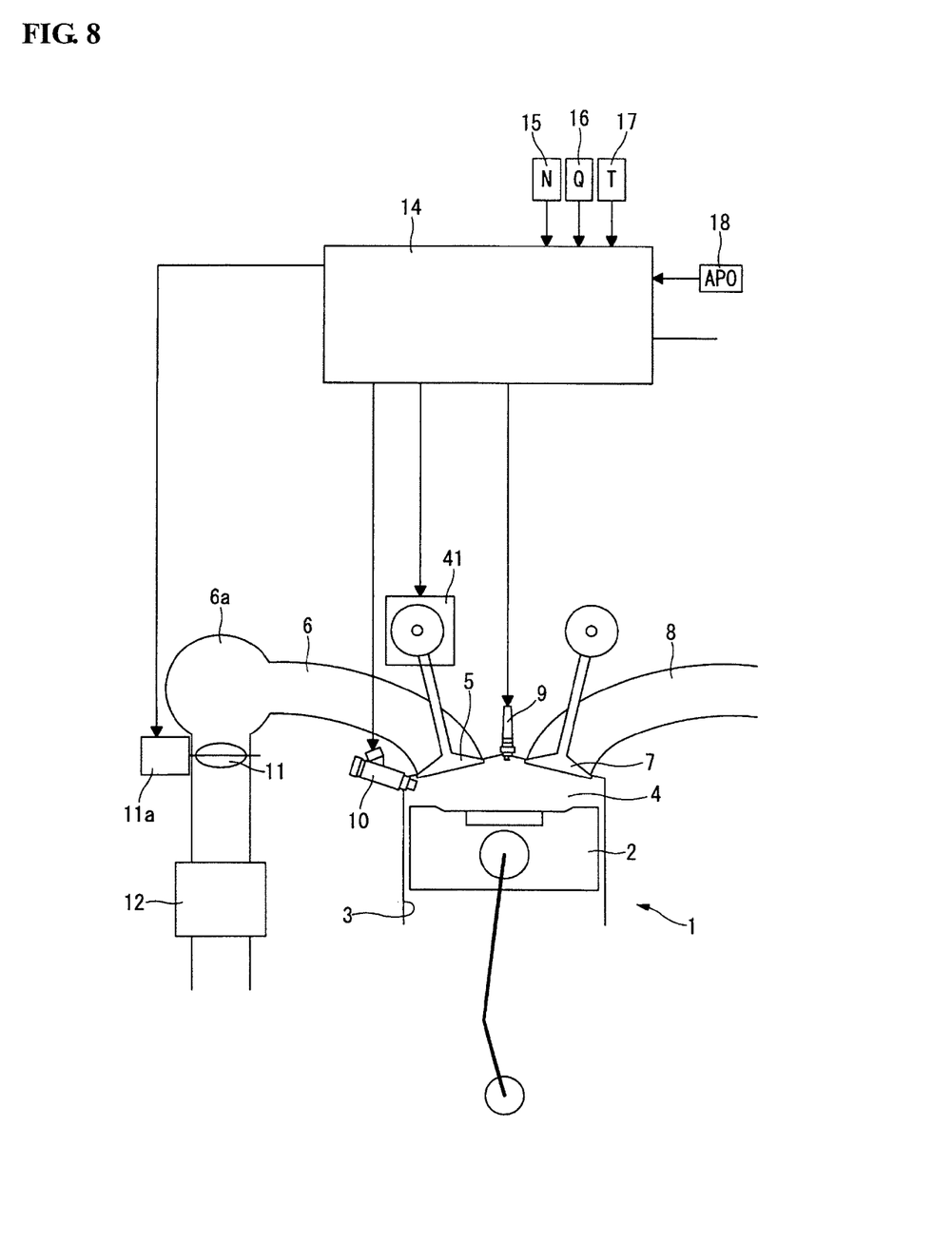
FIG. 8 is a schematic view of an internal combustion engine with a supercharger according to a third embodiment of the present invention.

A third embodiment of the present invention will be described below with reference to FIG. 8. In the third embodiment, a variable valve mechanism is mounted on at least one of the intake and exhaust valves 5 and 7 so as to increase or decrease the valve overlap of the intake and exhaust valves 5 and 7. In FIG. 8, the variable valve mechanism 41 has a known configuration that advances or retards at least the opening timing of the intake valve 5 relative to the fixed closing timing of the exhaust valve 7 and thereby increases or decreases the valve overlap between the intake valve opening timing and the exhaust valve closing timing.

The variable valve mechanism 41 is operated in such a manner that, when the load and rotation speed operation point of the internal combustion engine 1 is in the region C, the valve overlap is set larger as the cylinder bore wall temperature T is lower as in the case of FIGS. 5 and 7. It is thus possible to discharge the high-temperature remaining gas from the cylinder and suppress the temperature of the air-fuel mixture in the vicinity of the compression top dead center.

Figure 9:
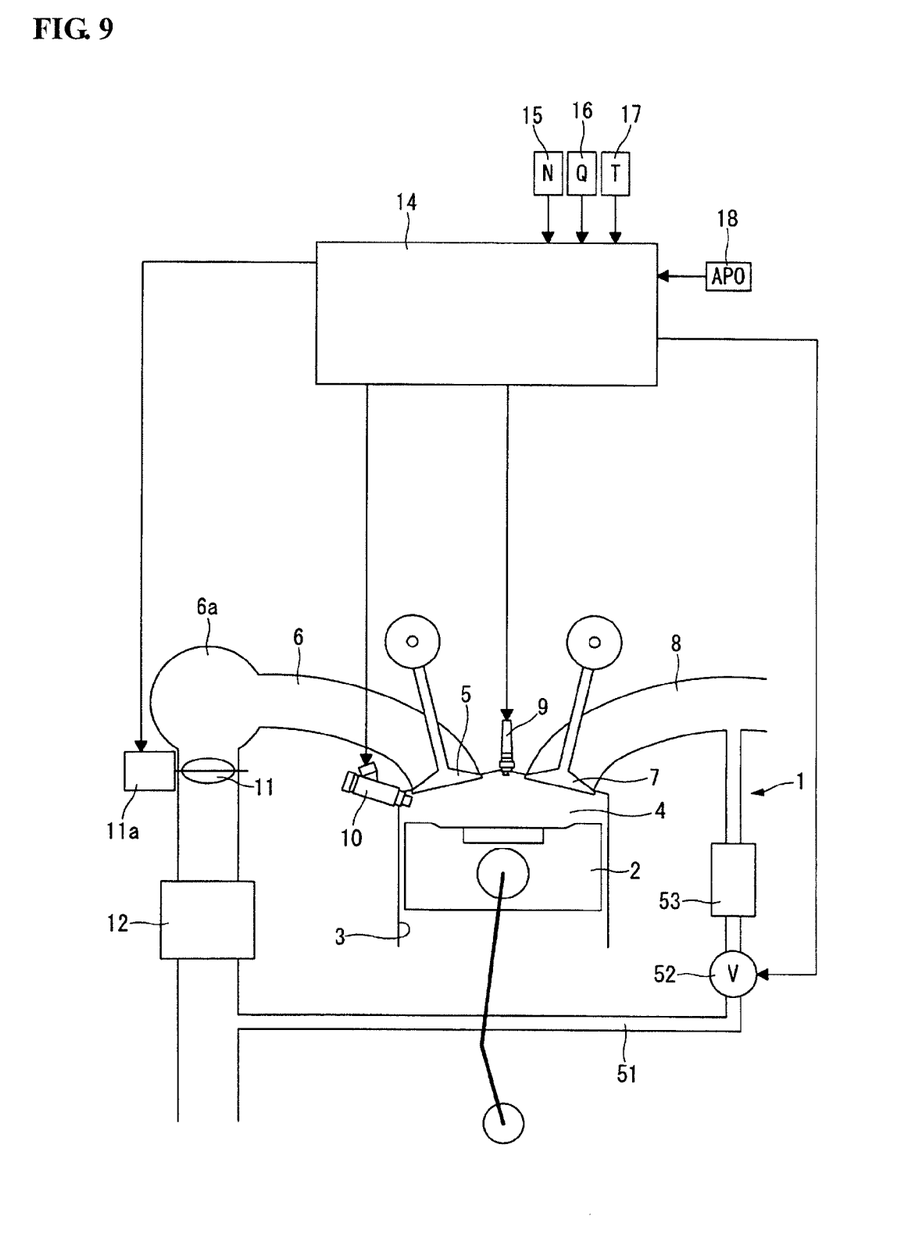
FIG. 9 is a schematic view of an internal combustion engine with a supercharger according to a fourth embodiment of the present invention.

A fourth embodiment of the present invention will be described below with reference to FIG. 9. In the fourth embodiment, an exhaust gas recirculation system is arranged in the internal combustion engine 1 so as to recirculate a part of exhaust gas from the exhaust system to the intake system. The exhaust gas recirculation system can be of known configuration. For example, the exhaust gas recirculation system has an exhaust gas recirculation passage 51 extending from the exhaust passage 8 to the intake passage 6, an exhaust gas recirculation control valve 52 capable of continuously controlling its opening by a step motor etc. to regulate the amount of recirculation of the exhaust gas and an EGR gas cooler 53 adapted to cool the recirculation gas with air or coolant.

In the fourth embodiment, the exhaust gas recirculation control valve 52 is operated in such a manner that, when the load and rotation speed operation point of the internal combustion engine 1 is in the region C, the amount of recirculation of the exhaust gas is set larger as the cylinder bore wall temperature T is lower as in the case of FIGS. 5 and 7. The heat capacity ratio of the air-fuel mixture inside the cylinder is decreased by the recirculation of the exhaust gas. It is thus possible to decrease the temperature of the air-fuel mixture in the vicinity of the compression top dead center even if the recirculated exhaust gas is higher in temperature than the intake air. As the temperature of the recirculated exhaust gas is decreased by the EGR gas cooler 53, the use of the EGR gas cooler 53 is more effective to suppress the temperature of the air-fuel mixture in the vicinity of the compression top dead center.

Figure 10:
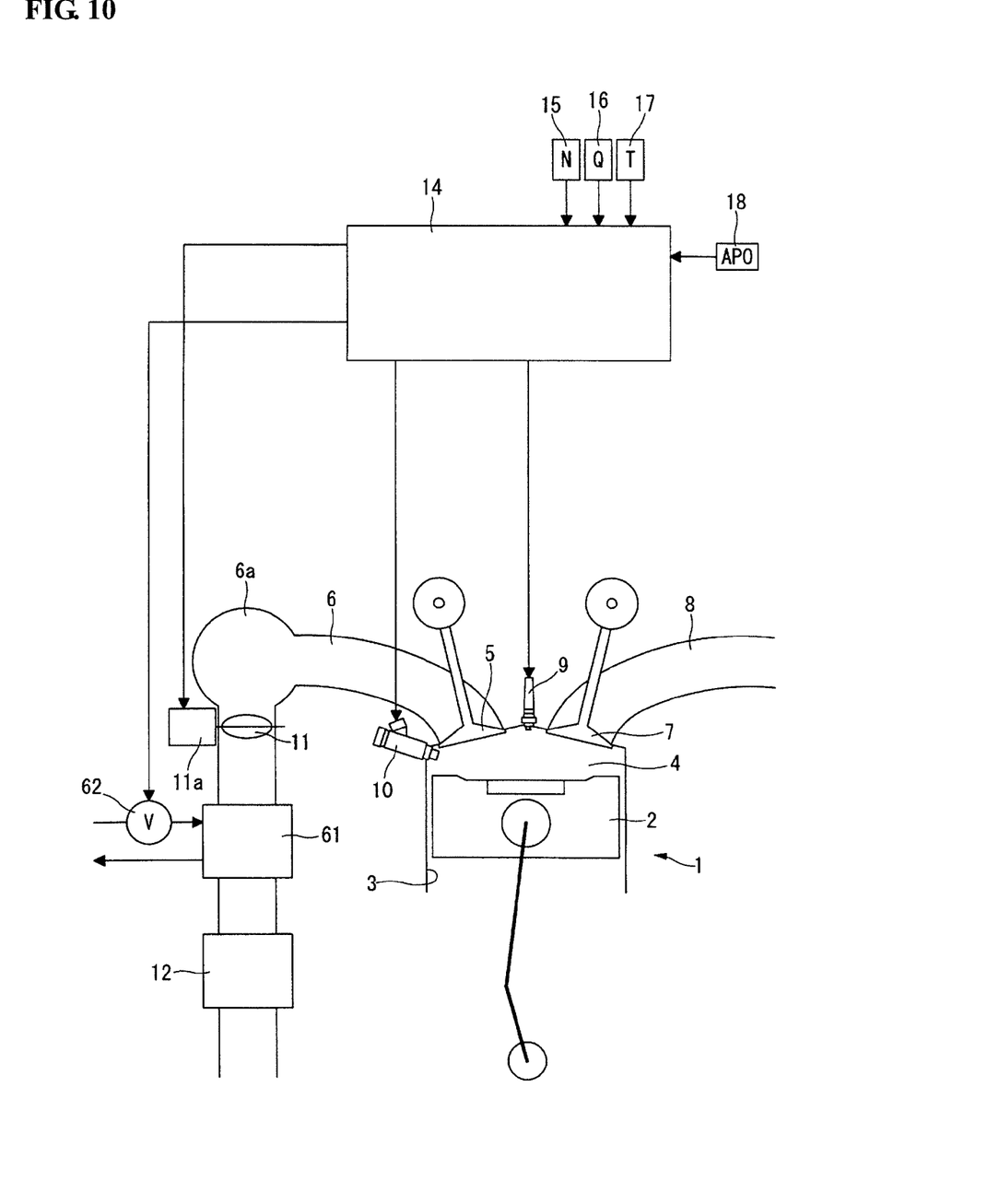
FIG. 10 is a schematic view of an internal combustion engine with a supercharger according to a fifth embodiment of the present invention.

A fifth embodiment of the present invention will be described below with reference to FIG. 10. In the fifth embodiment, a water-cooled intercooler 61 is disposed downstream of the supercharger 12 so as to cool the intake air; and a cooling water regulation valve 62 is arranged to regulate the amount of cooling water for heat exchange with the high-temperature intake air. In this configuration, the cooling degree of the intercooler 61 is controlled by varying the amount of cooling water supplied to the intercooler 61.

In the fifth embodiment, the opening of the cooling water regulation valve 62 is increased in such a manner that, when the load and rotation speed operation point of the internal combustion engine 1 is in the region C, the intake air is more positively cooled by the intercooler 61 as the cylinder bore wall temperature T is lower as in the case of FIGS. 5 and 7. It is thus possible to decrease the temperature of the intake air fed to the cylinder and suppress the temperature of the air-fuel mixture in the vicinity of the compression top dead center. The intercooler 61 enables more effective cooling of the intake air as the temperature of the cooling water decreases with the cylinder bore wall temperature T.

It is feasible to use any of the air-fuel mixture cooling means of the above embodiments in combination as appropriate.

The invention claimed is:

1. A control device for an internal combustion engine, the internal combustion engine comprising a cylinder direct injection fuel injector and a supercharger, the control device programmed to:

perform air-fuel mixture cooling control to suppress a temperature of an air-fuel mixture in the vicinity of a compression top dead center so as to prevent the occurrence of a pre-ignition phenomenon in which oil component acts as an ignition source to cause ignition before the ignition timing of a spark plug, wherein, when the internal combustion engine is operated in a predetermined low-speed supercharging region at an unwarmed state where a cylinder bore wall temperature of the internal combustion engine is lower than the cylinder bore wall temperature at completion of engine warm-up, the control device performs the air-fuel mixture cooling control in such a manner that the air-fuel mixture cooling control is increased as the cylinder bore wall temperature is lower.

2. The control device for the internal combustion engine according to claim 1, wherein performing the air-fuel mixture cooling control includes increasing a fuel injection amount of the fuel injector in such a manner that, as the cylinder bore wall temperature is lower, the rate of increase of the fuel injection amount is larger.

3. The control device for the internal combustion engine according to claim 1, wherein the internal combustion engine further comprises a variable compression ratio mechanism; and wherein performing the air-fuel mixture cooling control includes controlling the variable compression ratio mechanism to decrease a mechanical compression ratio of the internal combustion engine in such a manner that, as the cylinder bore wall temperature is lower, the mechanical compression ratio is lower.

4. The control device for the internal combustion engine according to claim 1, wherein the internal combustion engine further comprises a variable valve mechanism for varying at least one of intake valve opening timing and exhaust valve closing timing; and wherein performing the air-fuel mixture cooling control includes controlling the variable valve mechanism to increase a valve overlap between the intake valve opening timing and the exhaust valve closing timing in such a manner that, as the cylinder bore wall temperature is lower, the valve overlap is larger.

5. The control device for the internal combustion engine according to claim 1, wherein the internal combustion engine further comprises an exhaust gas recirculation system; and wherein performing the air-fuel mixture cooling control includes controlling the exhaust gas recirculation system to recirculate exhaust gas in such a manner that, as the cylinder bore wall temperature is lower, the rate of recirculation of the exhaust gas is larger.

6. The control device for the internal combustion engine according to claim 1, wherein the internal combustion engine further comprises an intercooler to cool intake air; and wherein performing the air-fuel mixture cooling control includes controlling the intercooler to cool the intake air in such a manner that, as the cylinder bore wall temperature is lower, the cooling of the intake air is increased.

7. A control method for an internal combustion engine, the internal combustion engine comprising a cylinder direct injection fuel injector and a supercharger, the control method comprising:

when the internal combustion engine is operated in a predetermined low-speed supercharging region at an unwarmed state where a cylinder bore wall temperature of the internal combustion engine is lower than the cylinder bore wall temperature at completion of engine warm-up, performing air-fuel mixture cooling control to suppress a temperature of an air-fuel mixture in the vicinity of a compression top dead center so as to prevent the occurrence of a pre-ignition phenomenon in which oil component acts as an ignition source to cause ignition before the ignition timing of a spark plug, wherein the air-fuel mixture cooling control is increased as the cylinder bore wall temperature is lower.

8. The control method for the internal combustion engine according to claim 7, wherein performing the air-fuel mixture cooling control includes increasing a fuel injection amount of the fuel injector in such a manner that, as the cylinder bore wall temperature is lower, the rate of increase of the fuel injection amount is larger.

* * * * *